United States Patent
Lu et al.

(10) Patent No.: US 8,195,606 B2
(45) Date of Patent: Jun. 5, 2012

(54) BATCH DATA SYNCHRONIZATION WITH FOREIGN KEY CONSTRAINTS

(75) Inventors: Bin Lu, Redmond, WA (US); Dima Belikov, Redmond, WA (US); Mehul Shah, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 672 days.

(21) Appl. No.: 12/333,581

(22) Filed: Dec. 12, 2008

(65) Prior Publication Data

US 2010/0153423 A1    Jun. 17, 2010

(51) Int. Cl.
*G06F 17/30* (2006.01)
(52) U.S. Cl. .......................................... 707/610; 707/624
(58) Field of Classification Search .................. 707/610, 707/612, 624, 646
See application file for complete search history.

(56) References Cited

U.S. PATENT DOCUMENTS

| | | | |
|---|---|---|---|
| 5,870,765 A * | 2/1999 | Bauer et al. .................... | 707/610 |
| 5,918,212 A | 6/1999 | Goodwin, III | |
| 6,529,917 B1 * | 3/2003 | Zoltan ................................... | 1/1 |
| 7,003,531 B2 | 2/2006 | Holenstein et al. | |
| 7,124,413 B1 | 10/2006 | Klemm et al. | |
| 7,363,327 B2 | 4/2008 | Bali et al. | |
| 7,567,990 B2 * | 7/2009 | Mitchell et al. ....................... | 1/1 |
| 2008/0228697 A1 | 9/2008 | Adya et al. | |

OTHER PUBLICATIONS

"Cross-Database Studio 6.0", Retrieved at<<http://www.dbbalance.com/db_studio.htm>>, Nov. 12, 2008, pp. 1-2.
"Incremental Updates Vs Full Reload Change Data Capture", Retrieved at<<http://www.connx.com/ftpdir/white/Change_Data_Capture_White_Paper.pdf>>, CONNX Solutions, Sep. 2007, pp. 1-16.
"How to: Specify the Order and Batch Size of Changes", Retrieved at<<http://msdn.microsoft.com/en-us/library/bb902828.aspx>>, Nov. 12, 2008, pp. 1-7.
"Synchronization Providers", Retrieved at<<http://msdn.microsoft.com/en-us/library/bb902826.aspx>>, Nov. 12, 2008, pp. 1-3.

* cited by examiner

*Primary Examiner* — Monica Pyo
(74) *Attorney, Agent, or Firm* — Turk IP Law, LLC (57) ABSTRACT

Data in tables with foreign key relationship is synchronized in batches employing a two-pass process during playback based on whether the foreign key constraint is a linear dependency, self-referencing, or cyclic. A separate table containing a primary key of records and database timestamp columns for change operations may also be used for batch synchronization in addition to or instead of adding database timestamp columns to existing tables.

19 Claims, 9 Drawing Sheets

BATCH DATA SYNCHRONIZATION WITH FOREIGN KEY CONSTRAINTS

BACKGROUND

With the proliferation of computerized automation of processes in every aspect of life, data storage and processing have become a major component of networked systems handling financial and other transactions. In such systems, data may be entered, modified, or deleted from a number of sources. The same data may be maintained in multiple data stores in same or different formats, and a data store may have to pick up or synchronize changes to data based on changes in a different store. Various data stores from simple tables to complicated databases may be maintained and synchronized as new entries or modifications are made by different sources. The changes may be synchronized at regular intervals. In many cases, the databases are partially or completely related.

When synchronizing data between databases, a typical solution is to maintain a detailed operation log at a source database and play back the operations in the original order during synchronization to a target database. The operation log keeps track of column level changes. That is, with every INSERT, UPDATE and DELETE operation, the original and new values for each column are maintained. These operations are then replicated or "played back" at the target database using the same sequence as determined by the operation log.

Over time the operation log may become very large. The operation log may be purged after the updates are played back on the target database, but this depends on being able to play back updates at a regular frequency. Also, a separate operation log table may have to be maintained for each table in the source database making the schema more cumbersome.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to utilizing a combination of linear dependency order and two-pass synchronization in updating databases related with foreign key constraints. Synchronization of databases is performed in batches as opposed to individual records. The process is customized depending on distinct categories of foreign keys: one-way foreign key, cyclical foreign key, and self-referencing foreign key.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, data in tables with foreign key relationship may be synchronized in batches employing a two-pass process based on foreign key constraint type. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, references are made to relational databases and specifically to Sequential Query Language (SQL) databases. Embodiments can be implemented in any relational database. Databases may be maintained and synchronized by a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
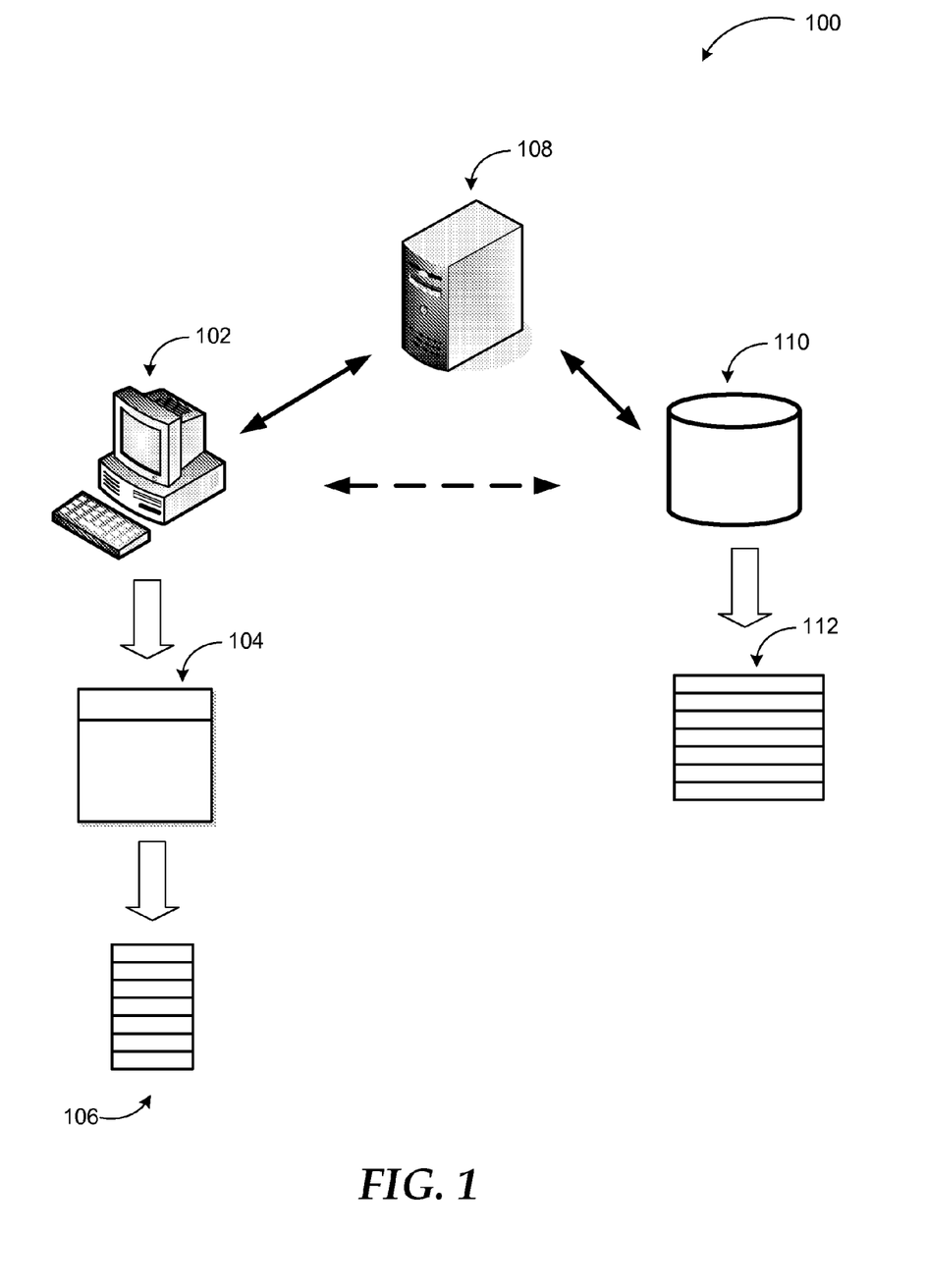
FIG. 1 is a conceptual diagram illustrating an example environment where synchronization of databases with foreign key constraints occurs.

FIG. 1 is a conceptual diagram illustrating an example environment where synchronization of databases with foreign key constraints occurs. Data management is encountered in most computing systems. Diagram 100 illustrates a basic data management system, where input for changes to existing data, deletions, or insertions of new data are provided through a computing device (102). An application 104 may automatically generate the input(s) as part of a process or receive from a user. Data may be stored locally (e.g. table 106) or remotely in a data store 110. Server 108 may manage data store 110, where another table 112 may reside.

A foreign key establishes a link between the data in two tables. In a foreign key reference, a link is created between two tables when the column or columns that hold the primary key value for one table are referenced by the column or columns in another table. This column becomes a foreign key in the referencing table. A foreign key constraint ensures that the values in one row of the referencing columns occur in a single row in the referenced table. Thus, a row in the referencing table cannot contain values that do not exist in the referenced table (except potentially NULL). A foreign key constraint also enforces referential integrity by guaranteeing that changes cannot be made to data in the primary key table (referenced table) if those changes invalidate the link to data in the foreign key table (referencing table). If an attempt is made to delete the row in a primary key table or to change a primary key value, the action will fail when the deleted or changed primary key value corresponds to a value in the foreign key constraint of another table. To change or delete a row in a foreign key constraint successfully, first either the foreign key data in the foreign key table must be deleted or changed, which links the foreign key to different primary key data.

When an operation log approach is used to maintain a sequence of changes to rows in the source database and these changes applied to the target database for data with foreign key constraints, column level changes have to be maintained as well (which columns were updated and the new values for those columns have to be recorded). It is not sufficient to simply maintain an ID of the updated row.

For example, an [Item] table may have a foreign key on a [DepartmentID] column that references the [ID] column of the [Department] table. According to an example scenario, following operations may occur in the source database:

```
INSERT INTO [Department] ([ID]) VALUES (100)
INSERT INTO [Item] ([ID], [DeparmentID]) VALUES (2, 100)
INSERT INTO [Department] ([ID]) VALUES (200)
UPDATE [Item] SET [DeparmentID] = 200 WHERE [ID] = 2.
```

If only an operation log with ID of the updated row is maintained, the log is as follows:

TABLE 1

| Sequence No | Operation | Table | Row ID |
|---|---|---|---|
| 1 | INSERT | DEPT | 100 |
| 2 | INSERT | ITEM | 2 |
| 3 | INSERT | DEPT | 200 |
| 4 | UPDATE | ITEM | 2 |

When the above changes are attempted to be applied to the target database in the sequence defined in the operation log of Table 1, step 2 would indicate to insert item record with ID=2. At that point, if this item record is read from the source database, it would refer to department ID 200. However, department ID 200 does not exist in target database until step 3. As a result, the record cannot be inserted into the target database. In order to avoid this scenario, the values of every column in the source database may be maintained in the operation log whenever a change happens. If that information is maintained a system performing the operations would know at step 2, the department ID referred by item with ID=2 is DepartmentID=100. In the target database, the item record with reference to department ID 200 may now be inserted. This approach, however, results in a large operation log.

Figure 2:
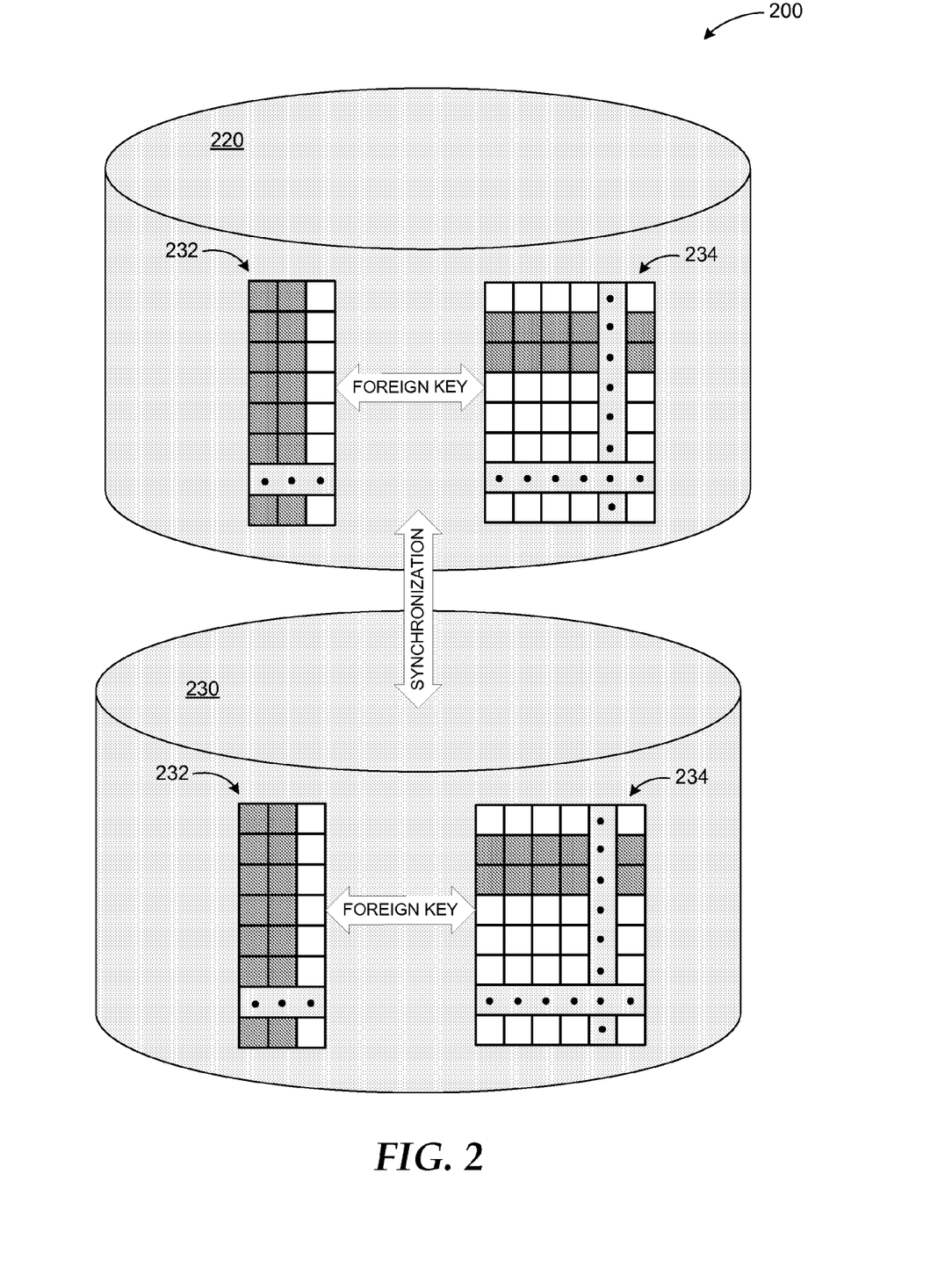
FIG. 2 illustrates example database structures where synchronization may be undertaken taking foreign key constraints into account according to embodiments.

FIG. 2 illustrates example database structures where synchronization may be undertaken taking foreign key constraints into account according to embodiments. As shown in diagram 200, synchronization may be performed between two data stores (220 and 230) for one or more tables (e.g. 232 and 234) linked through one or more foreign key constraints. Tables 232 and 234 are numbered using the same reference numerals in both data stores since they are intended to include the same data (after synchronization).

As discussed previously, maintaining an operation log to synchronize related tables may become cumbersome when the number of records and changes is high. According to some embodiments database timestamp columns may be maintained in each table in the source database instead of the separate operation log table. With this approach, each table contains a database timestamp column which contains the database timestamp of the latest change to the column. There are separate columns for tracking the database timestamp of the latest INSERT and UPDATE changes. The deleted records are moved to a tombstone table and tracked therein. The database maintains only the current data values instead of a history of the original and new value for each column. The timestamp may be tracked through a "dbtimestamp" numeric value that is incremented every time any data is changed in the database.

Data synchronization occurs in batches. At periodic intervals, a snapshot is captured from the source database of all records changed since the last snapshot. These changes are then applied in the target database. All changes in a snapshot are referred to as a batch of updates. All the inserted, updated, or deleted rows are lumped together as one batch. Since there is no operation log of every operation, the snapshot of changes in a batch is not ordered based on the sequence in which the operations occur in the source database. Instead, only a list of rows in every table that changed since the last snapshot is maintained. The list of changes is generated by identifying rows in every table where the last UPDATE or INSERT dbtimestamp of the row is greater than the dbtimestamp when the last synchronization was performed. Data values from these changed records in the source database are captured and applied in the target database.

Figure 3:
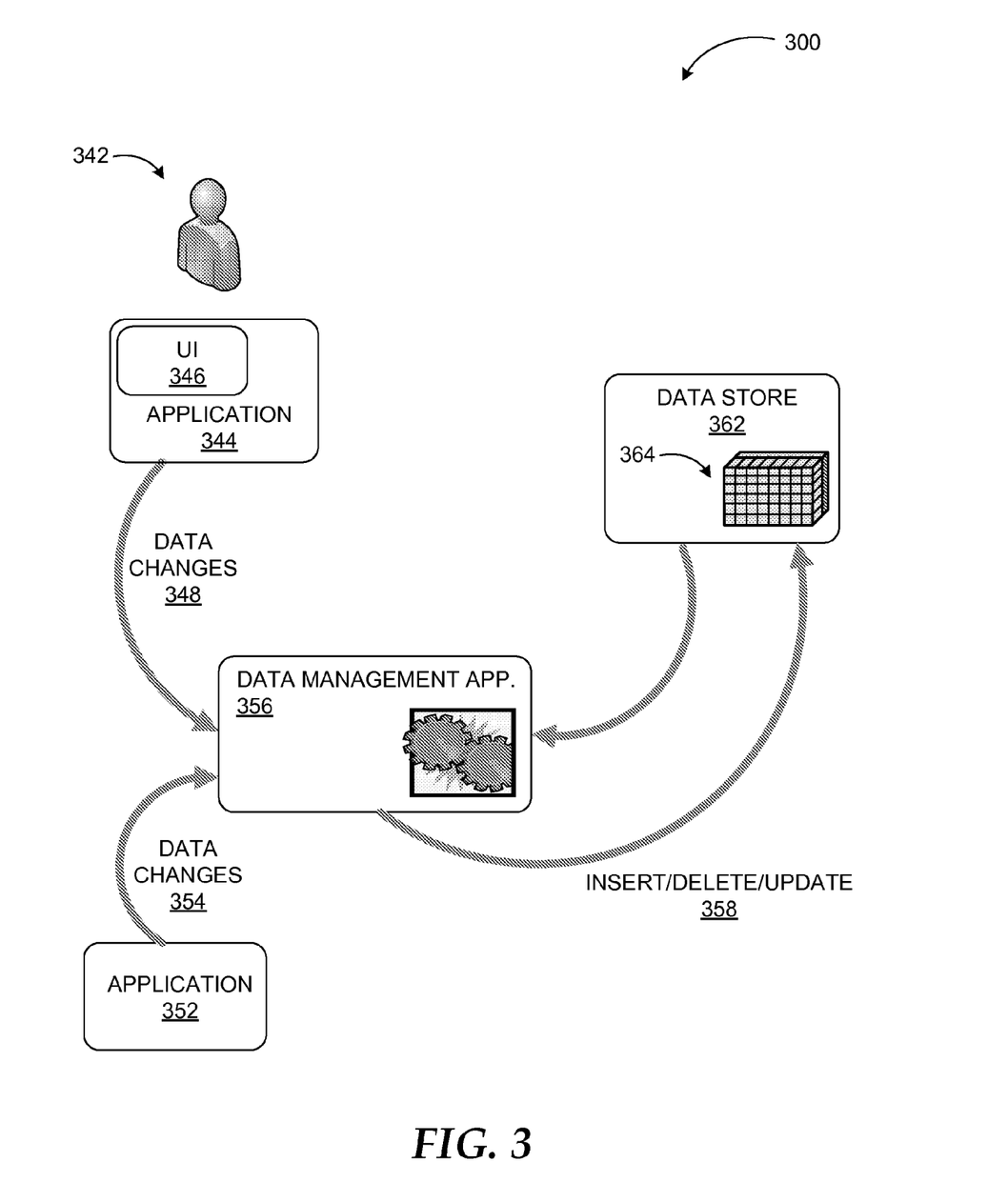
FIG. 3 is a conceptual diagram illustrating components of a system for synchronization of databases with foreign key constraints according to embodiments.

FIG. 3 includes conceptual diagram 300 illustrating components of a system for synchronization of databases with foreign key constraints according to embodiments. Data synchronization may take place at various components of a data management system. For example inputs in form of new data, modifications to existing data, or removal of existing data (348) may be provided by user 342 through application 344 employing user interface 346. Other data changes 354 may be generated and provided by application 352 without user intervention. Data management application 356 may receive the data changes 348 and 354, and update one or more relevant tables. The tables may be linked with others maintained in the same data store and the data stores synchronized employing the approaches described herein. When one of the linked tables is changed, the other or both tables may be synchronized through INSERT, UPDATE, and/or DELETE operations.

An example system is a retail data management system, where individual users and/or automated applications (e.g. Point of Sale "POS" applications, inventory applications) may provide changes to financial data such as sales information, inventory information, returned goods information, and similar data. Individual tables may be maintained for different categories of data (e.g. local or regional sales figures table), which include links with foreign key constraints to other tables (e.g. organizational performance data table). The related tables may then be synchronized employing the approaches described herein.

It should be noted, the links with foreign key constraints may exist between the same categories of data, not necessarily different categories. For example, the DEPARTMENT and ITEM tables in FIG. 4 below belong to the same category (i.e. inventory). DEPARTMENT table may contain records such as "Toys", "Clothing", "Hardware", etc. ITEM table may contain records such as "Lincoln Log Large Farmhouse", "Lincoln Log Small Farmhouse", "Pink Pajama", "Blue Pajama", etc. The two "Lincoln Log" items belong to the "Toys" department with a foreign key pointing to the "Toys" record in the DEPARTMENT table. The two "Pajama" items may have foreign key pointing to the "Clothing" record in the DEPARTMENT table.

While tables are used in the example systems, embodiments are not limited to two-dimensional data structures like tables. Other data storage forms such as data cubes, and so on, with foreign key constraints may also be synchronized using the principles discussed herein.

Figure 4:
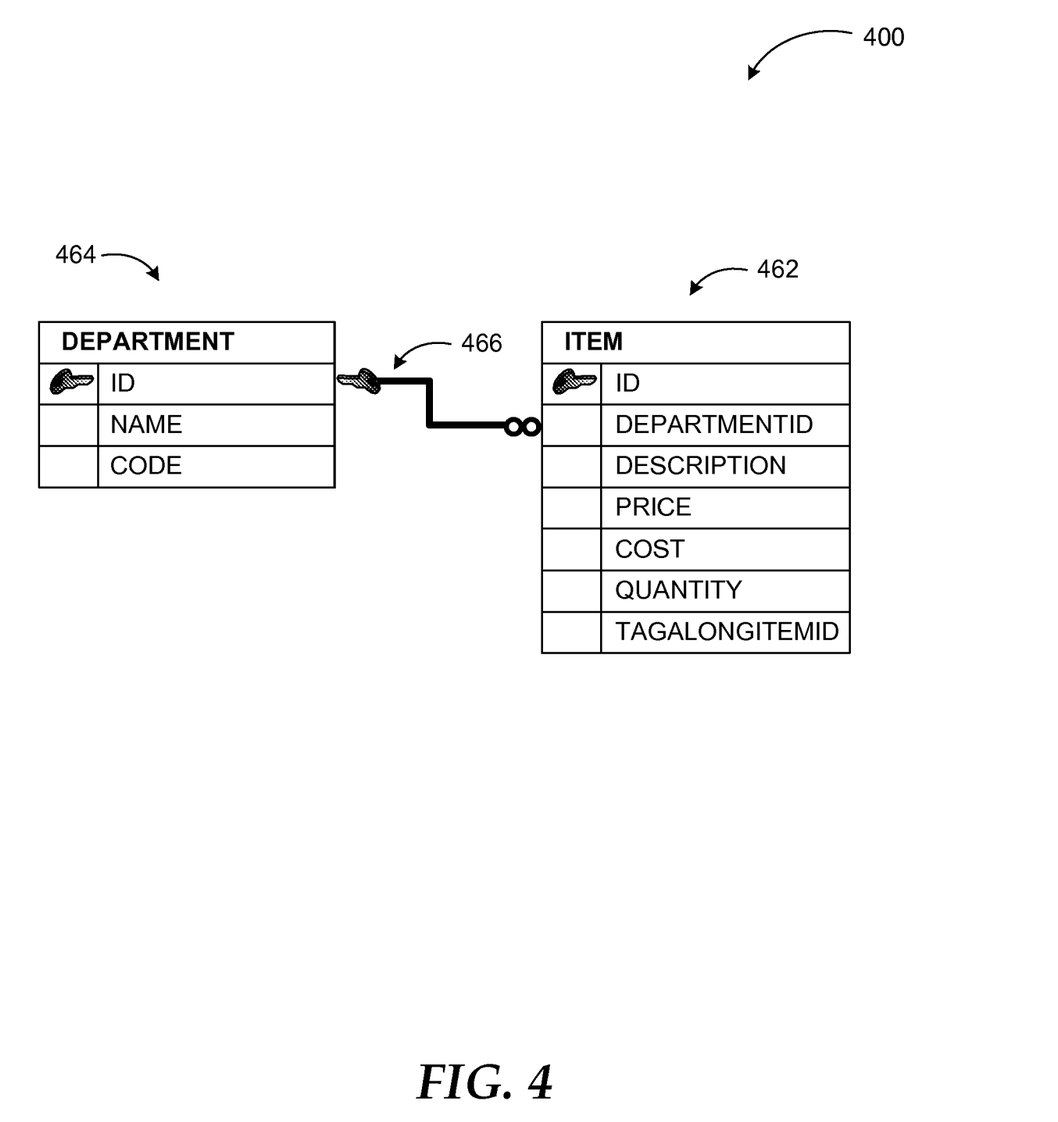
FIG. 4 illustrates two example tables with a one-way foreign key constraint.

FIG. 4 illustrates two example tables with a one-way foreign key constraint. Diagram 400 shows how a one-way foreign key relationship can be handled in updating example tables 462 and 464. [Item] table 462 has a foreign key 466 on [DepartmentID] column that references the [ID] column of the [Department] table 464. The foreign key column may or may not allow a NULL value. Database consistency may be maintained in both source and target databases and they may have the same [Department] and [Item] records before the synchronization. For synchronization, a linear dependency order may be established for the tables in one-way foreign key relationship. For example, the [Item] table 462 has a linear dependency on the [Department] table 464. For INSERT and UPDATE operations, changes in the referenced table (e.g. [Department] 464) may be played back in the target database (i.e. changes from one snapshot applied into the target database) before playing back the changes in the referencing table (e.g. [Item] 462). For the DELETE action, the order may be reversed such that changes in the referencing table are played back before the referenced table. Specific examples for each scenario are provided below.

In the INSERT scenario, a new [Department] is created in the source database, and two new [Item] records are created that reference the newly created [Department]:

```
INSERT INTO [Department] ([ID]) VALUES (100)
INSERT INTO [Item] ([ID], [DeparmentID]) VALUES (1, 100)
INSERT INTO [Item] ([ID], [DeparmentID]) VALUES (2, 100)
```

To synchronize the changes to the target database, the changes may be applied in the order of [Department] followed by [Item], i.e. creating the [Department] record first before creating the [Item] records.

In the UPDATE scenario, a new [Department] is created in the source database, and an existing [Item] is updated to reference the newly created [Department]:

```
INSERT INTO [Department] ([ID]) VALUES (200)
UPDATE [Item] SET [DeparmentID] = 200 WHERE [ID] = 2
```

To synchronize the changes to the target database, the changes may be applied in the order of [Department] followed by [Item]: first the [Department] record is created; then the [Item] record is UPDATEd in the target database to reference the newly created [Department].

According to a DELETE scenario, a [Department] record may be referenced by a single [Item] record. The single [Item] record may be the only record referencing the [Department] record. In source database, when a [Department] record is deleted, all rows in the [Item] table that refer to that [Department] table record may be deleted or updated to refer to a different department:

```
DELETE FROM [Item] WHERE ID = 1
DELETE FROM [Department] WHERE ID = 100
```

To synchronize the changes to the target database, the changes may be applied in the order of [Item] followed by [Department]. First delete the [Item] record, and then delete the [Department] record.

Figure 5:
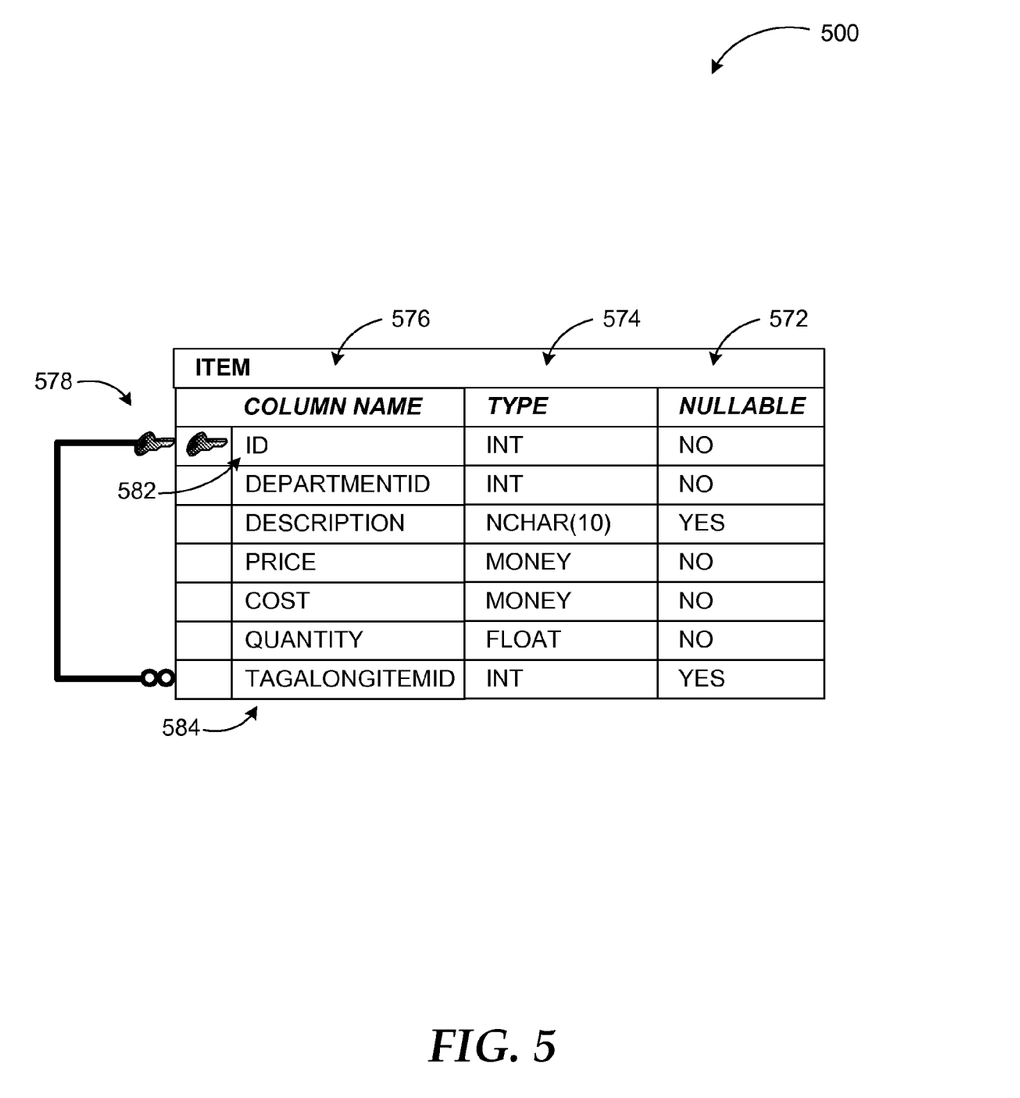
FIG. 5 illustrates an example table with a self-referencing foreign key constraint.

FIG. 5 illustrates an example table with a self-referencing foreign key constraint. Example [Item] table 500 includes three column designators: column name 576, record type 574, and nullability 572. [Item] table 500 has a foreign key 578 on [TagAlongItemID] column 584 that references the [ID] column 582 of the same [Item] table. A tag along item refers, in a retail application scenario, to an item which is sold for free when a given item is sold. It should be noted that in scenarios where foreign key constraints are applied with self referencing foreign keys, the foreign key column must allow NULL value. Otherwise, the constraint would prevent the insertion of the first [Item] record in the table. Each item may, or may not, be associated with a tag along item—if an item is not associated with a tagalong item, the [TagAlongItemID] column value is NULL.

In the INSERT scenario, a new [Item] record is created in the source database. Another new [Item] record is created that references the other newly created [Item] as a tag along item:

```
INSERT INTO [Item] ([ID], [TagAlongItemID]) VALUES (3, NULL)
INSERT INTO [Item] ([ID], [TagAlongItemID]) VALUES (4, 3).
```

To synchronize the changes to the target database, the changes may be applied in the same order as they were made in the SOURCE database, i.e. creating the [Item] record (ID=3) first, then creating the [Item] record (ID=4).

Short of an operation log in the source database, there is no guarantee that these operations will be replayed from the source database in the same order. It is possible that the INSERT action for [Item] record (ID=4) may be synchronized first before the INSERT action for [Item] record (ID=3). However, the foreign key constraint 578 requires that the [Item] record (ID=3) exists in the target database before the complete [Item] record (ID=4) can be applied to the target database. According to some embodiments, a two-pass mechanism is employed when applying the changes in the target database. In the first pass, the [Item] record (ID=4) is inserted with NULL [TagAlongItemID], then the [Item] record (ID=3) is inserted as is. In the second pass, the self-referencing foreign key is updated for the [Item] record (ID=4) such that its [TagAlongItemID] is set to the proper value. Thus, the first pass may include:

```
INSERT INTO [Item] ([ID], [TagAlongItemID]) VALUES (4, NULL)
INSERT INTO [Item] ([ID], [TagAlongItemID]) VALUES (3, NULL).
```

The second pass operations following the first pass according to these embodiments may include:

```
UPDATE [Item] SET [TagAlongItemID]=3 WHERE
    [ID]=4.
```

In the UPDATE scenario, a new [Item] record is created in the source database. An existing [Item] record is updated such that it references the newly created [Item] as a tag along item:

```
INSERT INTO [Item] ([ID], [TagAlongItemID]) VALUES (5, NULL)
UPDATE [Item] SET [TagAlongItemID] = 5, [Price] = 2.00
WHERE [ID] = 4.
```

To synchronize the changes to the target database, the changes may be applied in the same order as they were made in the source database, i.e. creating the [Item] record (ID=5) first, then UPDATE the [Item] record (ID=4). Short of an operation log in the source database, there is no guarantee that these operations will be replayed from the source database in the same order. It is possible that the UPDATE action for [Item] record (ID=4) may be synchronized first before the INSERT action for [Item] record (ID=5). However, the foreign key constraint requires that the [Item] record (ID=5) exists in the target database before the UPDATE for [Item] record (ID=4) can be applied to the target database. A two-pass mechanism may be applied as discussed above.

In the first pass, the [Item] record (ID=4) may be updated with NULL [TagAlongItemID], then the [Item] record (ID=5) may be inserted as is. In the second pass, the self-referencing foreign key may be updated for the [Item] record (ID=4) such that its [TagAlongItemID] is set to the proper value. Thus, the first pass may include:

```
UPDATE [Item] SET [TagAlongItemID]=NULL, [Price]=2.00
WHERE [ID]=4
INSERT INTO [Item] ([ID], [TagAlongItemID]) VALUES (5, NULL).
```

The second pass operations following the first pass according to these embodiments may include:

```
UPDATE [Item] SET [TagAlongItemID]=5 WHERE
    [ID]=4.
```

In the DELETE scenario, an existing [Item] record in the source database, which has a tag along item, is deleted. The deleted item is the last item that is associated with the tag along item. After its deletion, the tag along item is also deleted:

```
DELETE FROM [Item] WHERE [ID] = 4
DELETE FROM [Item] WHERE [ID] = 5.
```

When applying the changes to the target database, the changes may be applied in the same order as they were made in the source database, i.e. delete the [Item] record (ID=4) first, then delete the tag along [Item] record (ID=5). Short of an operation log in the source database, there is no guarantee that these operations will be replayed from the source database in the same order. It is possible that the DELETE action for [Item] record (ID=5) may be synchronized first before the DELETE action for [Item] record (ID=4). However, the foreign key constraint requires that the [Item] record (ID=5) cannot be deleted in the target database before the [Item] record (ID=4) still references it as tag along item in the target database.

Similar to the INSERT and UPDATE operations, a two-pass approach may be employed. In the first pass, instead of processing the DELETE operation for the [Item] record (ID=4), its self-referencing foreign key may be updated with NULL [TagAlongItemID]. In the second pass, the DELETE actions for the records can then proceed. Thus, the first pass may include:

```
UPDATE [Item] SET [TagAlongItemID]=NULL
    WHERE [ID]=4.
```

The second pass operations following the first pass according to these embodiments may include:

```
DELETE FROM [Item] WHERE [ID] = 4
DELETE FROM [Item] WHERE [ID] = 5.
```

As discussed in detail above, a two-pass approach is employed for tables that have self-referencing foreign key relationships. During the first pass, the INSERT and UPDATE actions apply changes to the non-foreign key columns only and use NULL for the referencing foreign key column. The DELETE actions are similarly processed as UPDATE—instead of deleting the record, the referencing foreign key column is set to NULL. During the second pass, the INSERT and UPDATE actions process the foreign key column only and set the proper value for the referencing foreign key column. The DELETE actions are then processed to delete the relevant records.

Figure 6:
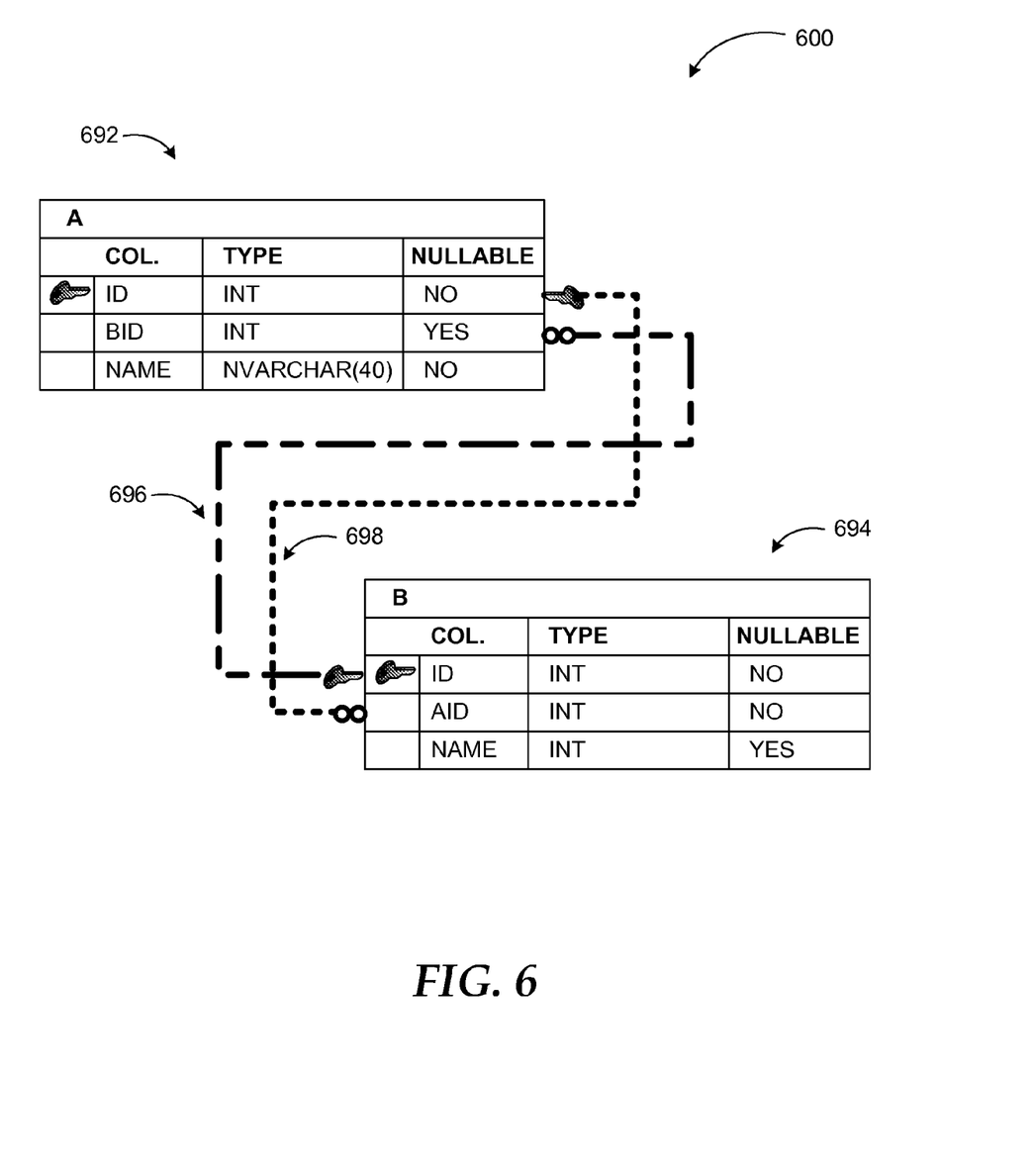
FIG. 6 illustrates two example tables with a cyclic foreign key constraint.

FIG. 6 illustrates two example tables with a cyclic foreign key constraint. In cyclic foreign key relationships, N foreign key relationships may exist among N tables with one referencing another that forms a cycle. For (N−1) such tables, the foreign keys must allow NULL value; otherwise the insertion of any of the records would be prevented. The example in diagram 600 illustrates such cyclic dependency with two tables (N=2), table [A] 692 and table [B] 694.

Table [A] 692 has a foreign key 696 on column [BID] that references the [ID] column of table [B] 694, whereas table [B] 694 has a foreign key 698 on column [AID] that references the [ID] column of table [A] 692. The column [A].[BID] allows NULL value so that the cyclic foreign key relationship does not block insertion of new records.

According to one embodiment, a new [A] record is created in source database for INSERT operation. Subsequently a new [B] record is created that references the newly created [A] record. The [A] record is then updated to reference the [B] record:

---
INSERT INTO [A] ([ID], [BID]) VALUES (1, NULL)
INSERT INTO [B] ([ID], [AID]) VALUES (100, 1)
UPDATE [A] SET [BID] = 100 WHERE [ID] = 1.

---

Since a snapshot of the changes applied to the source database are obtained, the changes may be read from the source database as follows:

---
INSERT INTO [B] ([ID], [AID]) VALUES (100, 1)
INSERT INTO [A] ([ID], [BID]) VALUES (1, 100).

---

To apply the changes to the target database, a linear dependency order may be established with a two-pass approach. In the first pass, since the foreign key column of [A].[BID] allows NULL value, [A] may be processed first before [B] with [A].[BID] set to NULL:

---
INSERT INTO [A] ([ID], [BID]) VALUES (1, NULL)
INSERT INTO [B] ([ID], [AID]) VALUES (100, 1).

---

In the second pass, the proper value for [A].[BID] may be determined:

UPDATE [A] SET [BID]=100 WHERE [ID]=1.

In the UPDATE scenario for cyclic foreign key relationships, a new [A] record is created in the source database. An existing [B] record is updated to reference the newly created [A] record. The [A] record is then updated to reference the [B] record:

---
INSERT INTO [A] ([ID], [BID]) VALUES (2, NULL)
UPDATE [B] SET [AID] = 2 WHERE [ID] = 100
UPDATE [A] SET [BID] = 100 WHERE [ID] = 2.

---

A database timestamp change tracking mechanism may track the current database values as the new changes since the last synchronization:

---
UPDATE [B] SET [AID] = 2 WHERE [ID] = 100
INSERT INTO [A] ([ID], [BID]) VALUES (2, 100).

---

To synchronize the changes to the target database, a linear dependency order is first established. A two-pass approach is employed. In the first pass, since the foreign key column of [A].[BID] allows NULL value, [A] is processed first before [B] with [A].[BID] set to NULL:

---
INSERT INTO [A] ([ID], [BID]) VALUES (2, NULL)
INSERT INTO [B] ([ID], [AID]) VALUES (100, 2).

---

In the second pass, the proper value for [A].[BID] is applied:

UPDATE [A] SET [BID]=100 WHERE [ID]=2.

For DELETE operation, the existing [A] records are first updated in the source database so that they do not reference a specific [B] record. The [B] record is then deleted. The existing [A] records, which referenced the [B] record, are also deleted:

---
UPDATE [A] SET [BID] = NULL WHERE [ID] = 1
UPDATE [A] SET [BID] = NULL WHERE [ID] = 2
DELETE FROM [B] WHERE [ID] = 100
DELETE FROM [A] WHERE [ID] = 1
DELETE FROM [A] WHERE [ID] = 2.

---

A database timestamp change tracking mechanism may track the current database values as the new changes since the last synchronization:

---
DELETE FROM [B] WHERE [ID] = 100
DELETE FROM [A] WHERE [ID] = 1
DELETE FROM [A] WHERE [ID] = 2.

---

To apply the changes to the target database, a linear dependency order is established as previously discussed. In the first pass of the two-pass approach, [A] is processed first before [B] since the foreign key column of [A].[BID] allows NULL value. Instead of deleting the [A] record, its foreign key column of [A].[BID] may be set to NULL:

---
UPDATE [A] SET [BID] = NULL WHERE [ID] = 1
UPDATE [A] SET [BID] = NULL WHERE [ID] = 2.

---

In the second pass, the DELETE actions are processed in the reverse order. [B] is processed before [A]. The DELETE for [B] can succeed because the [A].[BID] reference is set to NULL in the first pass. The DELETE for [A] records are processed after the delete records for A are processed:

---
DELETE FROM [B] WHERE [ID] = 100
DELETE FROM [A] WHERE [ID] = 1
DELETE FROM [A] WHERE [ID] = 2.

---

Thus, a combination of linear dependency order and two-pass solution may be used for cyclic foreign key relationship. During the first pass, if the foreign key column of a referencing table allows NULL value, the referencing table is processed first before the referenced table. For the referencing table in the NULL-able foreign key relationship, the INSERT and UPDATE actions set the non-foreign key columns only and use NULL for the referencing foreign key column. The DELETE actions are processed as UPDATE to set NULL for the referencing foreign key column. For the referenced table in the NULL-able foreign key relationship, the INSERT and UPDATE actions are processed as is, and the DELETE actions are skipped. During the second pass, the order is reversed such that the referenced table in the NULL-able foreign key relationship is processed first before the referencing table. The DELETE actions are processed as is to delete the relevant records. For the referencing table in the NULL-able foreign key relationship, the INSERT and UPDATE actions set the foreign key column only and set the proper value for the referencing foreign key column.

In the above described approaches, addition of database timestamp columns have been discussed for each table to track when a record was inserted and last updated. Under that approach, a query has to be run against all records in a table in order to query a list of all records that have changed since the last snapshot. In some scenarios, the total number of records in a table may be large and the number of records updated between snapshots may be a very small. For example, in a retail data management scenario, the total number of sales transactions in a database may be large, but the number of transactions performed each day may be a small number. In such cases, a variation may be applied that enables capture of a snapshot quickly.

An operation log as discussed above does not need database timestamp columns. A change log, on the other hand, actually depends on adding database timestamp columns to existing tables. For example, there may be 100,000 records of historical transactions in a [SalesTransaction] table. If there are only two sales after last synchronization, two new records are created in the [SalesTransaction] table. Instead of searching all 100,000 for two records that have changed since last snapshot, a separate change log may be created according to embodiments capturing the primary key and database timestamp for the two changes only when the change occurs. Before the synchronization begins, based on the change log records, the two changes may be directly fetched from [SalesTransaction].

To summarize, an operation log is a record that captures every change in every row. For each change, it captures previous values and the updated values for data cells in the row. A change log or change summary according to embodiments is effectively a list of rows which have changed after a particular time or after a particular timestamp.

Each change log table may contain just the primary key of the record and database timestamp columns for insertion, latest update, and deletion. Records may be added to these change log tables every time insert/update/delete operations are performed. If multiple changes are applied to the same record, only one row in the change log table with the database timestamp of the latest update may be kept. After capturing a snapshot of changes, the change log table may be purged (records are deleted). This way, the total number of records in the change log table is smaller and corresponds to the total number of records updated between two consecutive snapshots.

While specific operations, databases, and operation sequences have been discussed in the example scenarios and foreign key relationships in conjunction with FIG. 4 through FIG. 6, embodiments are not limited to those. Batch data synchronization with foreign key constraints may be implemented employing other operations, sequences, and so on, using the principles discussed herein.

Figure 7:
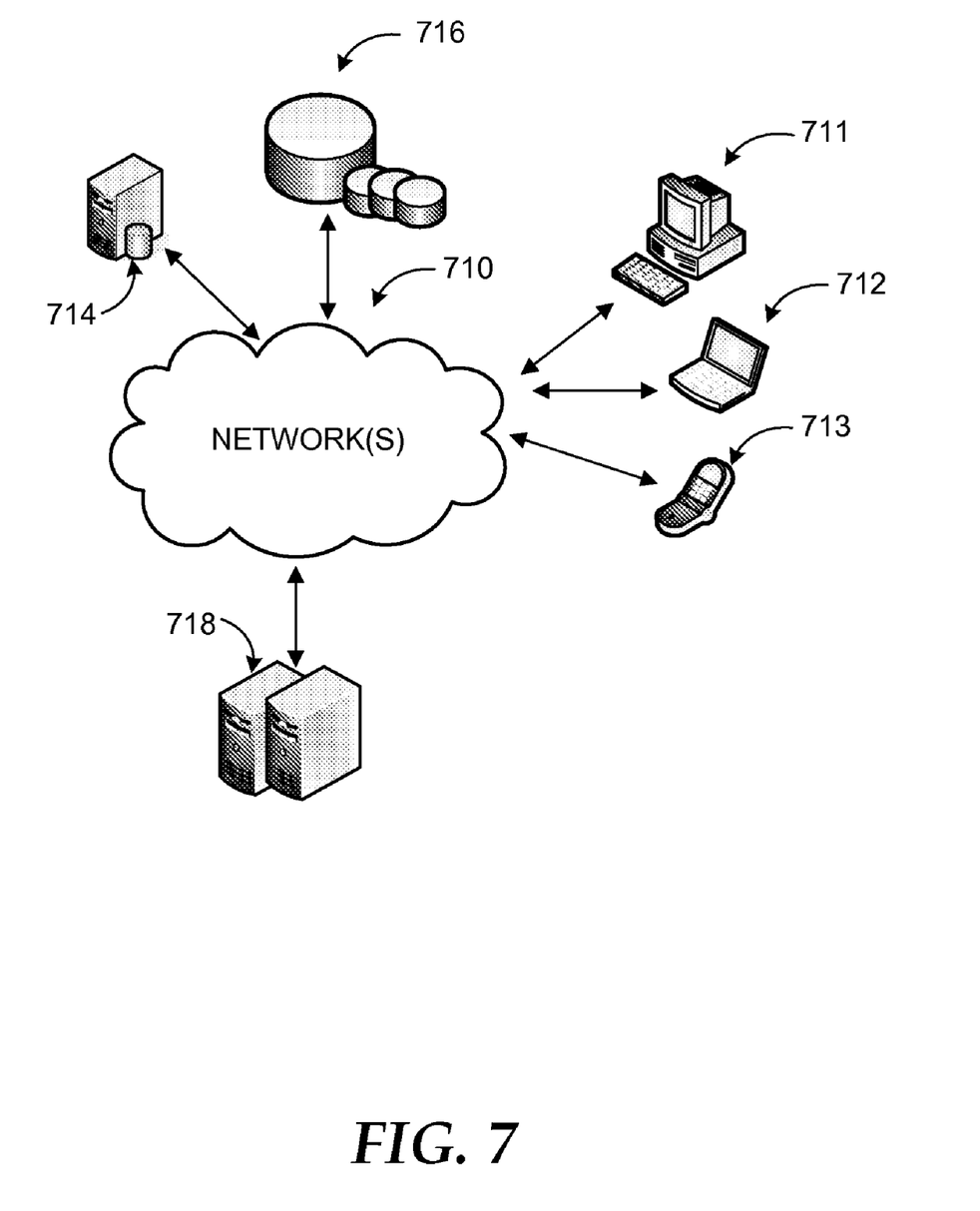
FIG. 7 is a networked environment, where a system according to embodiments may be implemented.

FIG. 7 is an example networked environment, where embodiments may be implemented. A data management system managing one or more databases and synchronizing data with foreign key constraints in batches may be implemented via software executed over one or more servers 718 such as a hosted service. The server 718 may communicate with client applications on individual computing devices such as a cellular phone 713, a laptop computer 712, and desktop computer 711 (client devices) through network(s) 710. Client devices 711-713 may modify a portion of the data such as in financial systems, which may then be carried over to the main database or synchronized with other databases.

As discussed above, tables with foreign key constraint may be updated employing a two-pass process with distinct sequences for INSERT, UPDATE, and DELETE operations. Data such as the synchronized tables may be stored in one or more data stores (e.g. data store 716), which may be managed by any one of the servers 718 or by database server 714.

Network(s) 710 may comprise any topology of servers, clients, Internet service providers, and communication media. A system according to embodiments may have a static or dynamic topology. Network(s) 710 may include a secure network such as an enterprise network, an unsecure network such as a wireless open network, or the Internet. Network(s) 710 provides communication between the nodes described herein. By way of example, and not limitation, network(s) 710 may include wireless media such as acoustic, RF, infrared and other wireless media.

Many other configurations of computing devices, applications, data sources, and data distribution systems may be employed to implement a system for synchronizing data with foreign key constraints in batches. Furthermore, the networked environments discussed in FIG. 7 are for illustration purposes only. Embodiments are not limited to the example applications, modules, or processes.

Figure 8:
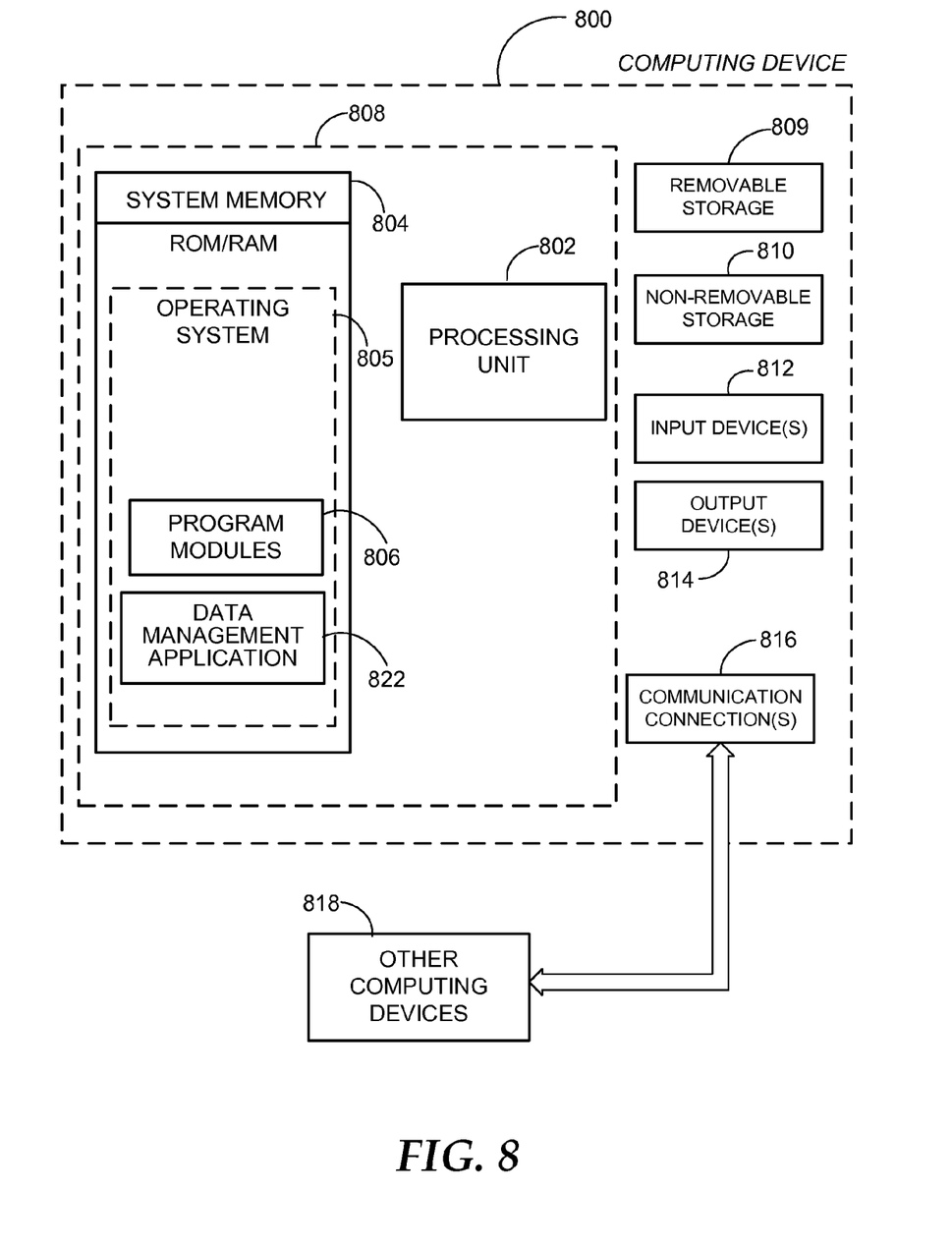
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be a server in a database management system and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806 and data management application 822.

Data management application 822 may be a separate application or an integral module of a hosted service that provides data processing services to client applications/devices. Data management application 822 may receive modifications to data from a variety of sources such as other applications through an automated process or through user input. The modifications may then be synchronized between related databases/tables employing the mechanisms described previously. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wireless network in a distributed computing environment, a satellite link, a cellular link, and comparable mechanisms. Other devices 818 may include computer device(s) that execute applications enabling users to input new data, modify existing data, and remove existing data for a number of purposes. Communication connection(s) 816 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
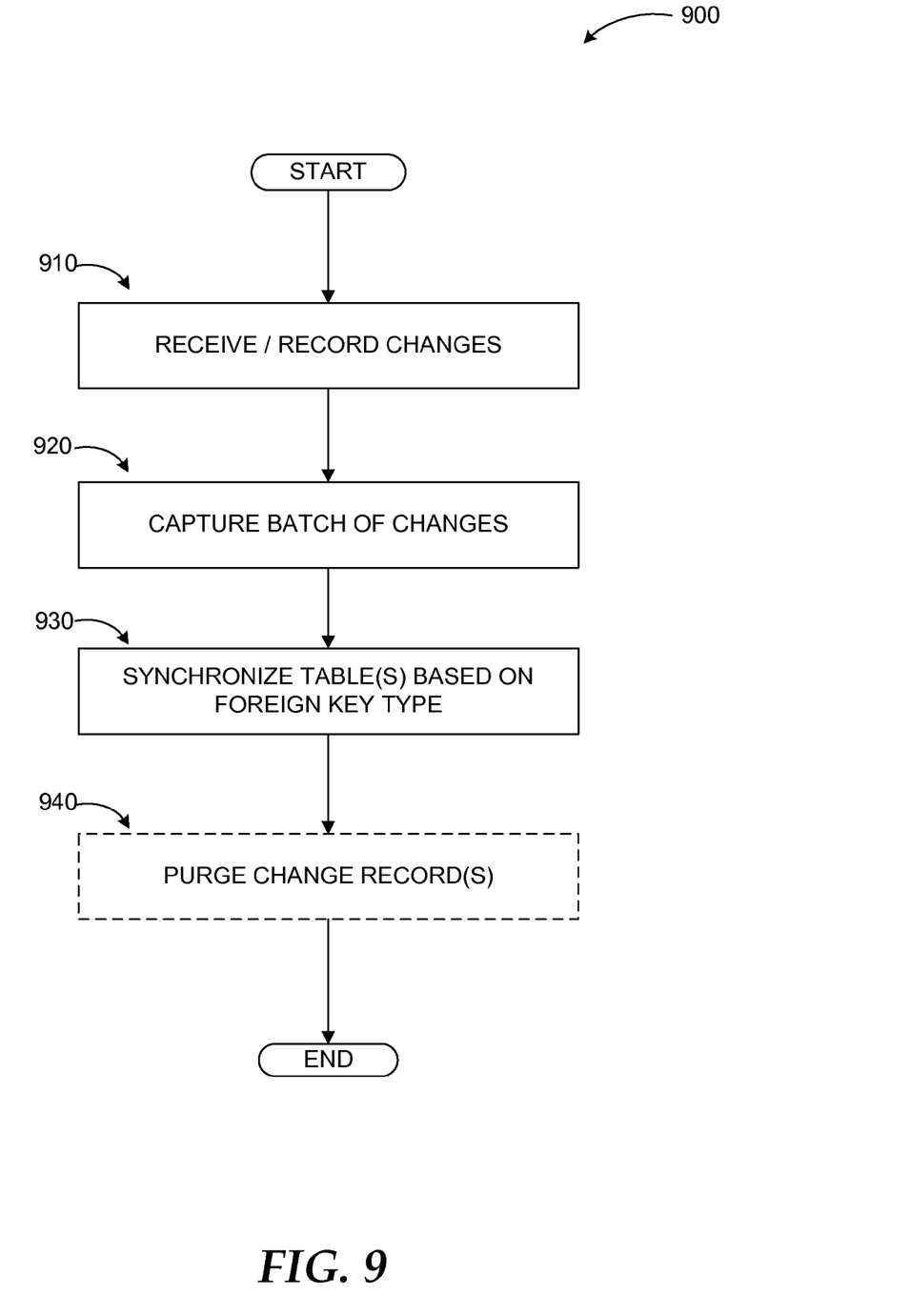
FIG. 9 illustrates a logic flow diagram for synchronizing databases with foreign key constraints according to embodiments.

FIG. 9 illustrates a logic flow diagram 900 for synchronizing data with foreign key constraints according to embodiments. Process 900 may be implemented at a server as part of a data management system such as the one described above in conjunction with FIG. 7.

Process 900 begins with operation 910, where changes to one or more tables with foreign key constraint are received and/or recorded. The changes may be received from a user or from an automated application in form of new data, modification of existing data, or deletion of existing data. The changes may be recorded in the respective table(s) locally or remotely. Furthermore, a separate change log table as discussed above may also be employed. Processing proceeds to operation 920 from operation 910.

At operation 920, a batch of changes is captured for synchronization. The capture may be performed periodically or non-periodically based on a predefined time interval or a change amount threshold (e.g. if more than a predefined number of changes occur). Processing advances to operation 930 from operation 920.

At operation 930, the tables are synchronized depending on a type of the foreign key constraint as discussed previously. INSERT, UPDATE, and DELETE operations are performed in particular sequences in one or two passes on the referencing and referenced tables. The order and application of the operations is determined by the foreign key constraint type. Processing then moves to optional operation 940.

At optional operation 940, records of captured changes may be purged to reduce a need for data storage space. For example, in the case of separate change log table, the data in the table may be purged upon synchronization saving database space as well as reducing a number of necessary operations (the data associated with prior batches does not have to be processed in any way).

The operations included in process 900 are for illustration purposes. Batch data synchronization with foreign key constraints may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for managing data synchronization between linked tables, the method comprising:
   determining a linear foreign key relationship between a referencing table and a referenced table;
   determining a cyclic foreign key relationship between the referencing table and the referenced table;
   capturing changes in at least one of the referencing table and the referenced table in a batch, wherein each batch of changes is captured at predefined intervals;
   synchronizing the referencing table and the referenced table by applying the captured batch of changes in the referencing table and the referenced table, wherein the tables are synchronized by:
      applying the captured changes for cyclic foreign key relationships through a two-pass process, wherein the referencing table is processed before the referenced table if a foreign key column of the referencing table allows predefined unused values;
      applying INSERT and UPDATE operations in the referenced table before applying the INSERT and UPDATE operations in the referencing table; and
      applying DELETE operations in the referencing table before applying the DELETE operations in the referenced table.

2. The method of claim 1, wherein the linear foreign key relationship is determined by one of:
receiving a definition of the linear relationship; and
dynamically discovering the foreign key relationship.

3. The method of claim 1, further comprising:
determining a self-referencing foreign key relationship between the referencing table and the referenced table; and
synchronizing the tables by applying the captured changes for self-referencing foreign key relationships through a two-pass process, wherein during a first pass:
INSERT and UPDATE operations are applied to non-foreign key columns only,
a predefined unused value is used for referencing foreign key columns, and
the referencing foreign key columns are set to the predefined unused value for DELETE operations; and
wherein during a second pass:
INSERT and UPDATE operations are applied to the foreign key columns only,
a corresponding value is set for the referencing foreign key columns, and
DELETE operations are applied following the INSERT and DELETE operations.

4. The method of claim 1, further comprising performing operations during a first pass including:
for the referencing table:
applying INSERT and UPDATE operations to non-foreign key columns only,
applying a predefined unused value for referencing foreign key columns, and
setting the referencing foreign key columns to the predefined unused value for DELETE operations; and
for the referenced table:
applying INSERT and UPDATE operations, and
omitting DELETE operations.

5. The method of claim 1, further comprising performing operations during a second pass including:
for the referenced table:
applying omitted DELETE operations, and
for the referencing table:
applying INSERT and UPDATE operations to the foreign key column only, and
setting corresponding values for the referencing foreign key columns.

6. The method of claim 1, further comprising:
inserting a timestamp column associated with captured batches of data changes to changed tables.

7. The method of claim 1, further comprising:
generating a change log table that includes a primary key of each record changed in a table and a timestamp of each change to a record; and
purging the change log table following each capture of a batch of changes.

8. The method of claim 7, wherein the change includes one of: an INSERT operation, and UPDATE operation, and a DELETE operation, and wherein a single row of timestamps reflecting a latest change are maintained in the change log table for records subject to a plurality of changes.

9. A data management server for managing data synchronization between linked tables with a foreign key constraint, the server comprising:
a memory for storing computer-executable instructions;
a processor coupled to the memory, the processor configured to execute instructions to cause actions including:
receive changes to at least one of a referencing table and a referenced table linked with a foreign key constraint;
capture the changes in at least one of the referencing table and the referenced table in batches at predefined intervals;
if the foreign key constraint is a linear one, synchronize the referencing table and the referenced table by:
applying INSERT and UPDATE operations based on captured changes in the referenced table before applying the INSERT and UPDATE operations based on captured changes in the referencing table, and
applying DELETE operations based on captured changes in the referencing table before applying the DELETE operations based on captured changes in the referenced table; and
if the foreign key constraint is a self-referencing one, synchronize the tables by applying:
during a first pass:
INSERT and UPDATE operations to non-foreign key columns only,
a predefined unused value for referencing foreign key columns, and
the predefined unused value for DELETE operations on the referencing foreign key columns; and
during a second pass:
INSERT and UPDATE operations to the foreign key columns only,
a corresponding value for the referencing foreign key columns, and
DELETE operations following the INSERT and DELETE operations.

10. The data management server of claim 9, wherein the processor is further configured to:
if the foreign key constraint is a cyclic one, synchronize the referencing table and the referenced table by applying during a first pass:
INSERT and UPDATE operations to non-foreign key columns and the predefined unused value for foreign key columns in the referencing table; and
after completing operations in the referencing table, INSERT and UPDATE operations only in the referenced table.

11. The data management server of claim 10, wherein the processor is further configured to:
if the foreign key constraint is a cyclic one, synchronize the referencing table and the referenced table by applying during a second pass:
DELETE operations in the referenced table; and
after completing operations in the referenced table, INSERT and UPDATE operations on foreign key columns in the referencing table.

12. The data management server of claim 9, wherein the processor is further configured to purge the captured changes upon completion of the synchronization.

13. The data management server of claim 9, wherein the predefined unused value is a NULL value.

14. The data management server of claim 9, wherein the processor is further configured to:
maintain a list of rows in every table that was subject to a change since the latest capture of changes; and
determine a batch of changes to be applied based on the list of rows.

15. The data management server of claim 9, wherein referencing table and the referenced table are portions of a data cube.

16. A computer-readable storage medium with instructions stored thereon for managing data synchronization between linked tables with a foreign key constraint, the instructions comprising:
- receiving changes to at least one of a referencing table and a referenced table linked with a foreign key constraint;
- capturing the changes in at least one of the referencing table and the referenced table in batches at predefined intervals;
- synchronizing the referencing table and the referenced table by applying a captured batch of changes in the referencing table and the referenced table, wherein the tables are synchronized by:
  - for linear foreign key constraints, applying INSERT and UPDATE operations first in the referenced table then in the referencing table and DELETE operations first in the referencing table then in the referenced table;
  - for cyclic foreign key constraints, applying a first set of operations to the referencing table first and to the referenced table second during a first pass, and applying a second set of operations to the referenced table first and to the referencing table second during a second pass; and
  - for self-referencing foreign key constraints, applying INSERT and UPDATE operations to non-foreign key columns and NULL value to referencing foreign key columns during a first pass, and applying INSERT and UPDATE operations to foreign key columns and DELETE operations following the INSERT and UPDATE operations during a second pass.

17. The computer-readable storage medium of claim 16, wherein the first set of operations include:
- INSERT and UPDATE operations to non-foreign key columns and application of a NULL value for foreign key columns in the referencing table, and
- after completing operations in the referencing table, INSERT and UPDATE operations only in the referenced table; and
- wherein the second set of operations include:
  - DELETE operations in the referenced table, and
  - after completing operations in the referenced table, INSERT and UPDATE operations on foreign key columns in the referencing table.

18. The computer-readable storage medium of claim 16, wherein the instructions further comprise:
- inserting a timestamp column associated with captured batches of data changes to changed referencing and referenced tables.

19. The computer-readable storage medium of claim 16, wherein the instructions further comprise:
- generating a change log table that includes a primary key of a record subject to change and timestamp columns for at least one from a set of: INSERT, UPDATE, and DELETE operations;
- adding each record subject to change since a last batch data synchronization to the change log table;
- if a record is subject to a plurality of changes, only maintaining the latest change; and
- purging the change log table following each batch data synchronization.

* * * * *